United States Patent [19]

Tseng

[11] 4,448,161
[45] May 15, 1984

[54] INTERNAL COMBUSTION ROTARY POWER PLANT SYSTEM

[76] Inventor: Ching-Ho Tseng, 7307 Caracas Dr., Houston, Tex. 77083

[21] Appl. No.: 368,390

[22] Filed: Apr. 14, 1982

Related U.S. Application Data

[62] Division of Ser. No. 160,628, Jun. 18, 1980.

[51] Int. Cl.³ ............................................. F02B 53/00
[52] U.S. Cl. .................................................... 123/237
[58] Field of Search ............... 123/204, 234, 235, 236, 123/237, 238

[56] References Cited

U.S. PATENT DOCUMENTS

| | | | |
|---|---|---|---|
| 1,116,471 | 11/1914 | Neumeyer | 123/236 |
| 1,272,728 | 7/1918 | Tower | 123/248 |
| 4,240,394 | 12/1980 | Lay | 123/237 X |

FOREIGN PATENT DOCUMENTS 701438  1/1931  France ................................ 123/204

Primary Examiner—Michael Koczo
Attorney, Agent, or Firm—John F. McClellan, Sr.

[57] ABSTRACT

An internal combustion power plant system provides a rotary engine and a rotary fuel/air mixture compressor for the rotary engine on a common driveshaft, coaxially mounting each end and supported between them by a gearbox which synchronizes operation of various ignition and valve and abutment components of the system; compressed fuel/air mixture is supplied to and ignited in a valve-isolated manifold chamber in the rotary engine in successive charges following which each ignited charge is valved radially into one of plural expanding chambers defined by the rotary engine rotor and abutment mechanism, where it urges rotation of the rotor and then exhausts radially; in preferred embodiment the exhaust actuates a parallel fuel-feed which booster pumps fuel/air mixture into the manifold chamber; detail improvements disclosed include designs of runners, abutments, valving and rotary compressor mechanism.

1 Claim, 31 Drawing Figures

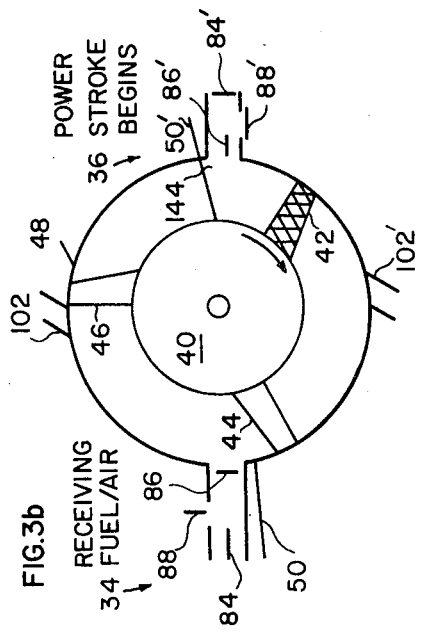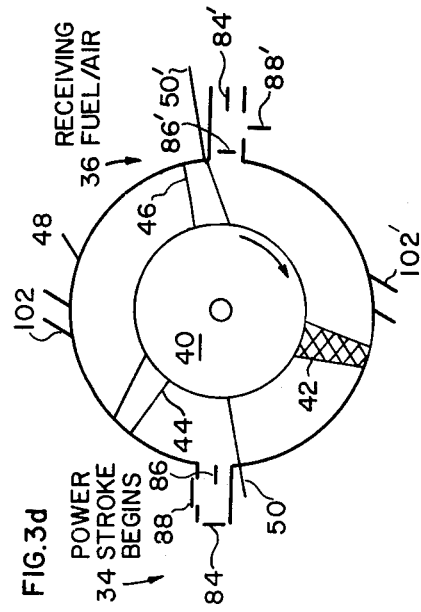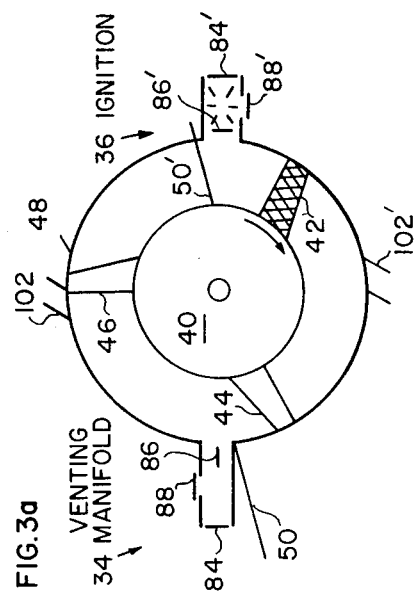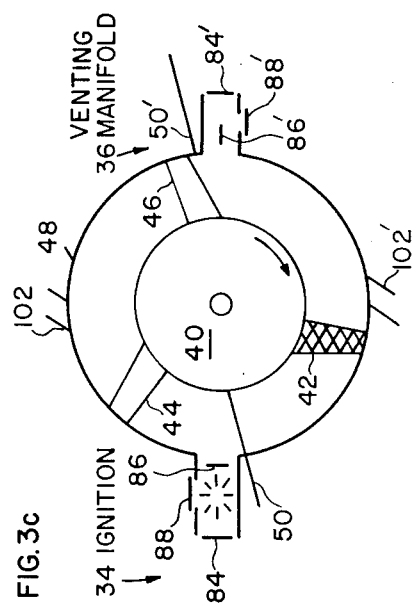

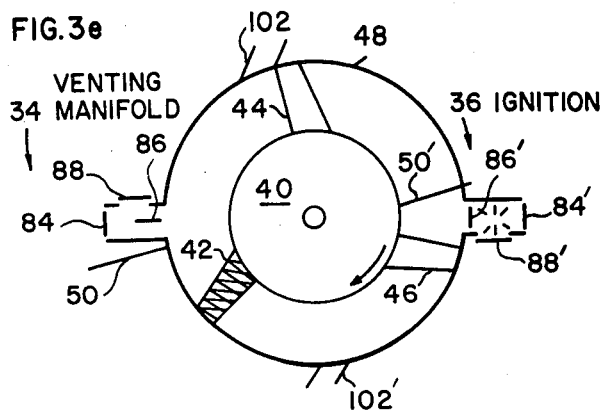
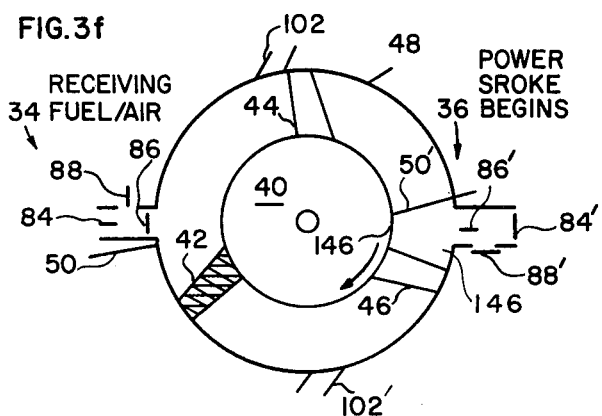
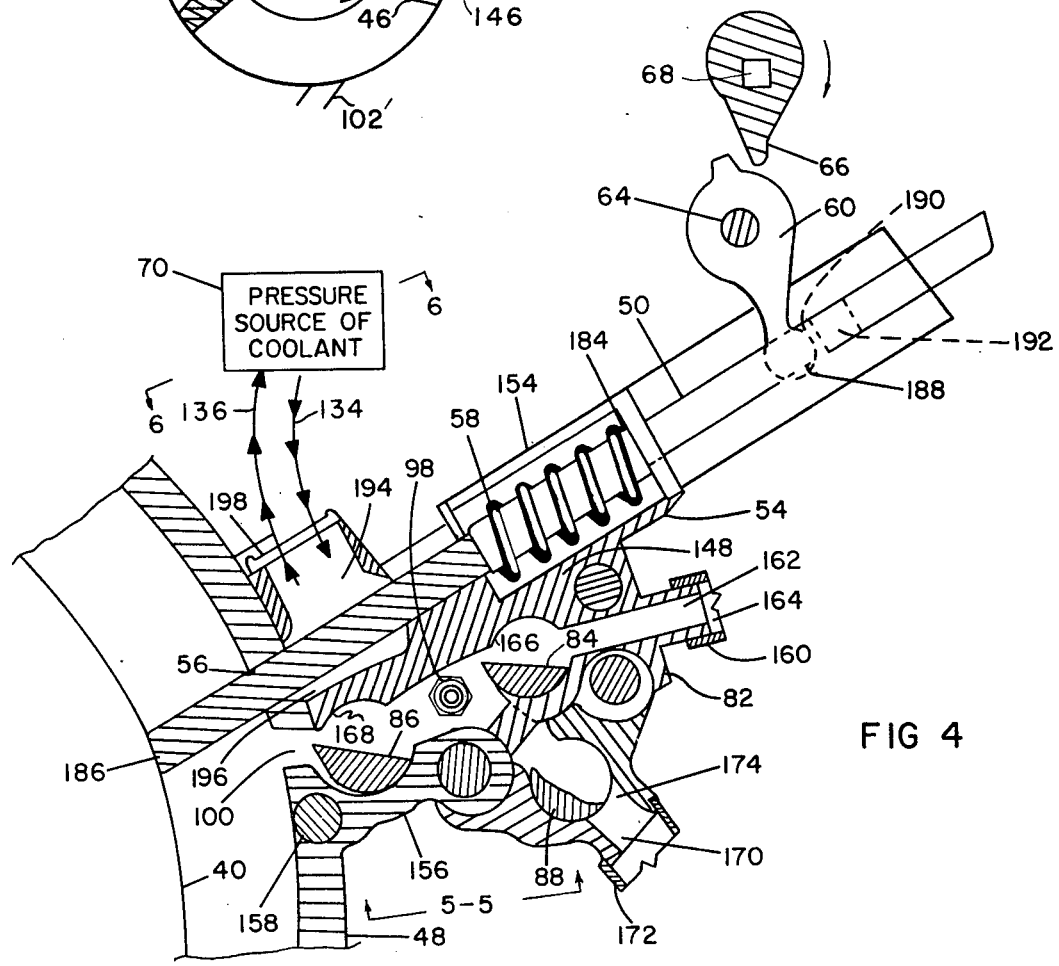

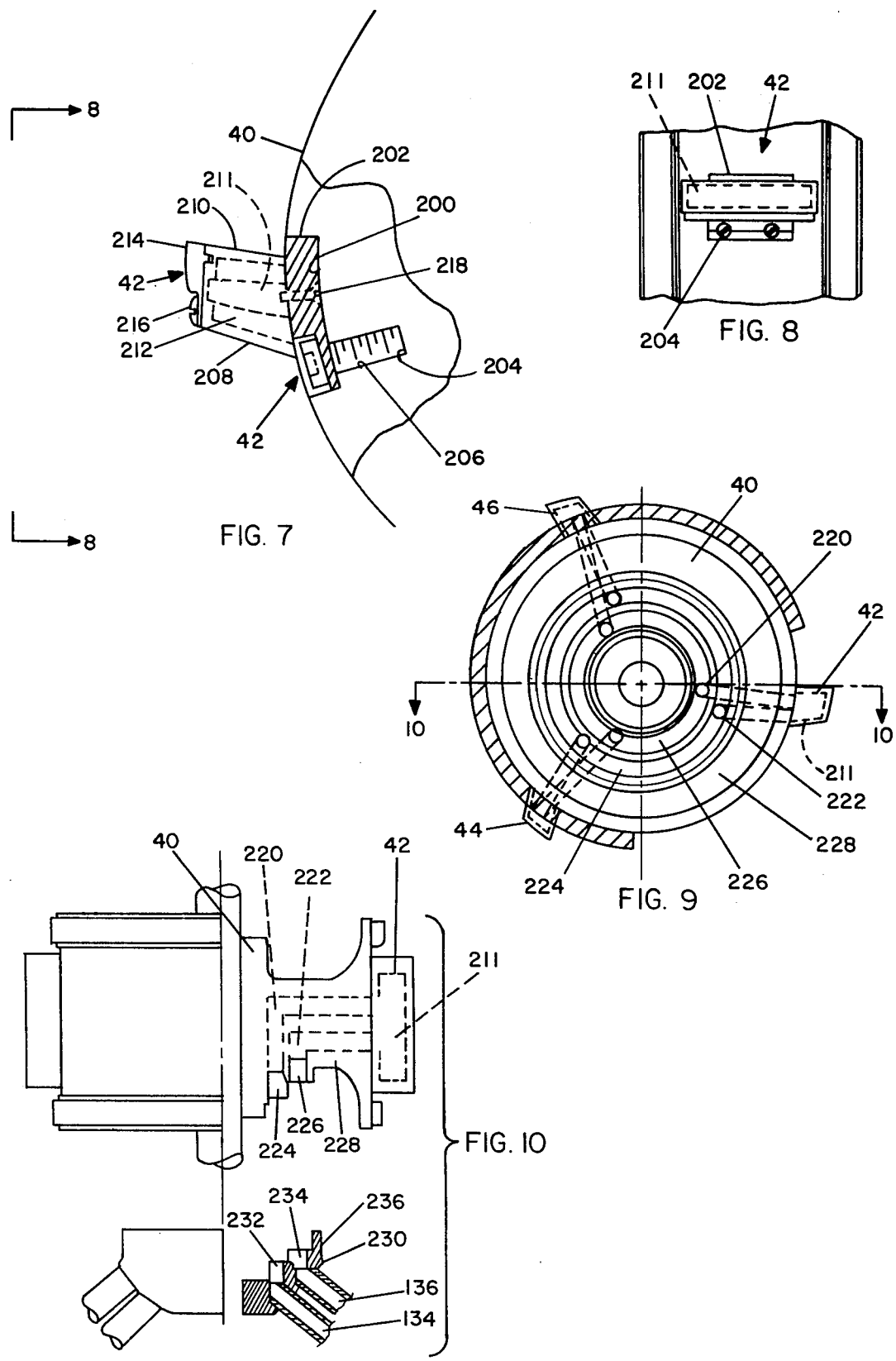

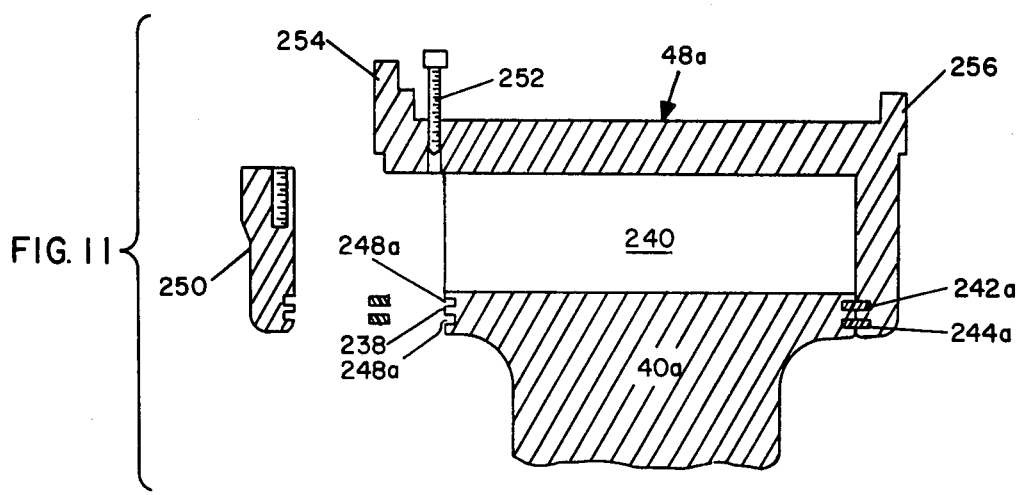
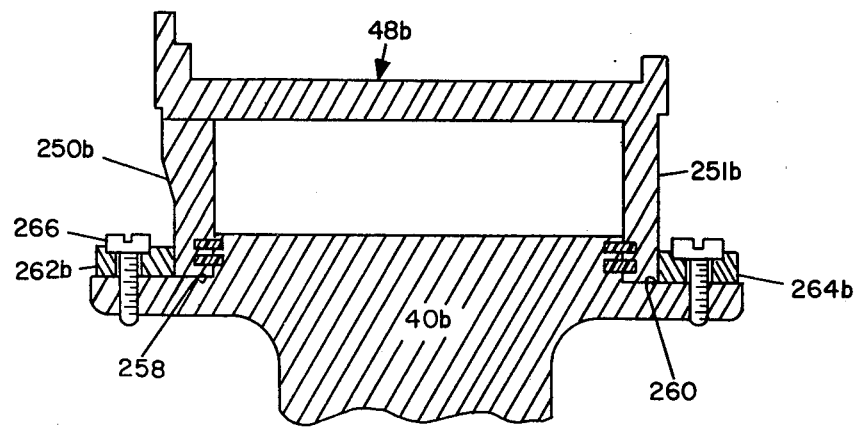
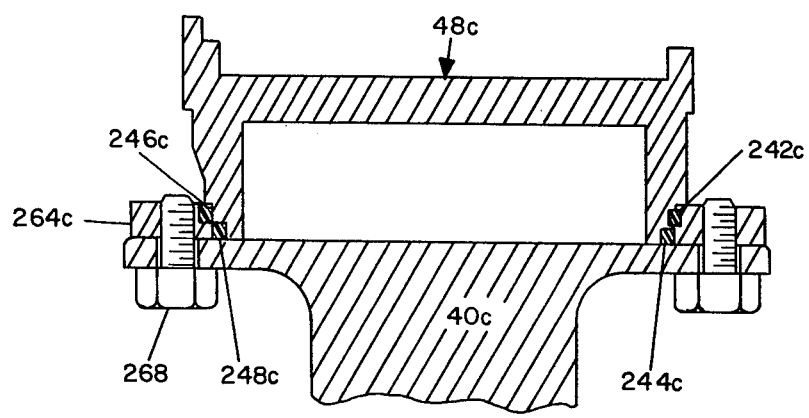

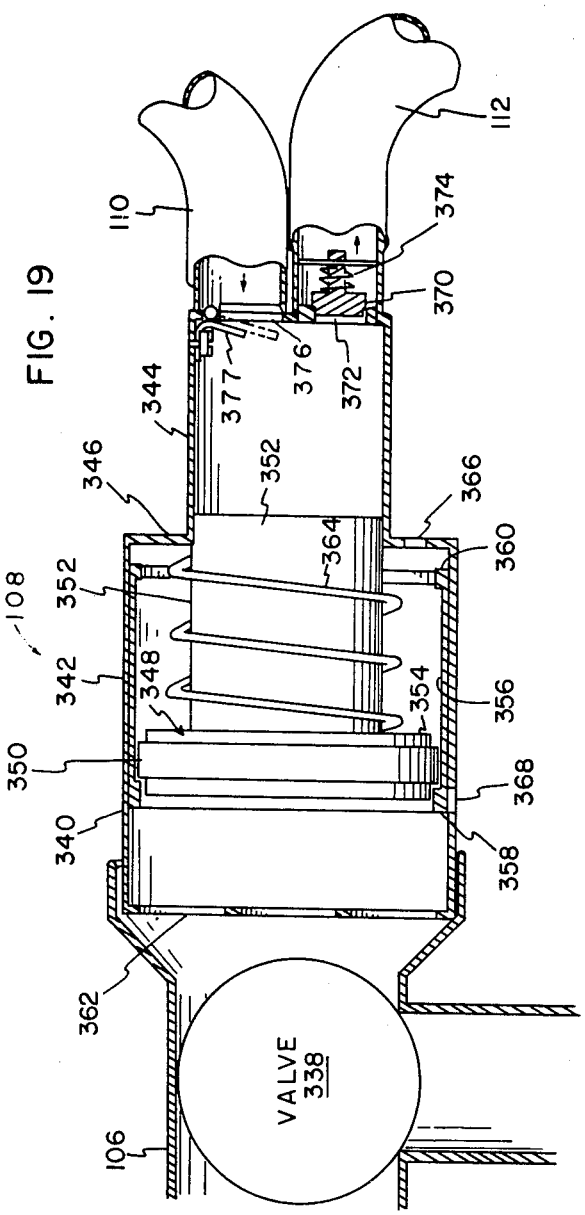
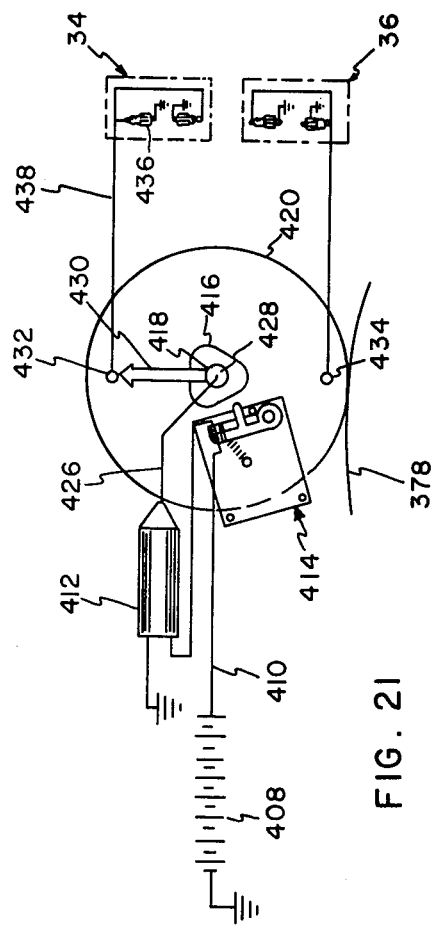
FIG. 19
FIG. 21

INTERNAL COMBUSTION ROTARY POWER PLANT SYSTEM

This is a division of application Ser. No. 160,628 filed June 18, 1980.

FIELD OF THE INVENTION

This invention refers generally to power plants and specifically to internal combustion rotary power plant systems.

Although internal combustion rotary power plant systems have been known for substantially more than half a century and have in some embodiments such as in the Wankel types received sustained development efforts in many countries simultaneously, an efficient, simple, economical, durable, flexible and reliable system has yet to become a standard of commerce in this field, and to provide such is a principal object of this invention.

PRIOR ART

In the prior art numerous rotary power plant systems and system components have been disclosed, including those in the following patents:

U.S. Pat. No. 3,924,529 to P. B. Johnson, Dec. 9, 1975, discloses the concept of dual annular chamber devices on the same shaft and having two opposed spring biased sliding abutments in a rotary internal combustion engine; two intake ports and two exhaust ports are used;

U.S. Pat. No. 3,692,002 to R. H. Williams, Sept. 19, 1972, discloses a rotary internal combustion engine with pivotal sleeve valves driven by cam, and pre-compressed-fuel injection;

U.S. Pat. No. 3,748,727 to V. F. J. Marcoux, Nov. 18, 1969, discloses a rotary combustion engine with pivotal sleeve valves and external cam drive for same;

U.S. Pat. No. 3,361,119 to B. P. Foxley-Connolly, Dec. 2, 1968, discloses a rotary internal combustion engine with dual intake ports, dual chambers and pre-compression of combustion gas;

U.S. Pat. No. 2,346,646 to E. J. Beech, Apr. 14, 1944, discloses a rotary engine with a pair of lateral seals on each side and cam driven abutments;

U.S. Pat. No. 2,155,755 to J. Sapp, Apr. 25, 1939, discloses a rotary internal combustion engine with dual elements on same shaft, each serving as working element and partially as pumping element, and having spring driven abutments;

U.S. Pat. No. 1,780,443 to O. Schumann, Nov. 4, 1930, discloses pump and working engine on the same shaft in a rotary internal combustion engine arrangement;

U.S. Pat. No. 1,275,619 to C. C. Smiley, Aug. 13, 1918, discloses rotary gas engine structure with two pumps and an engine on the same shaft and with an opposed pair of abutments;

U.S. Pat. No. 1,235,786 to J. A. Fleming, Aug. 8, 1917, discloses dual pump/engine provision on the same shaft with spring biased abutments and pre-compression of air for the fuel mixture, in a rotary engine configuration;

U.S. Pat. No. 1,047,913 to J. T. Bustin, Dec. 24, 1912, discloses pump and engine on the same shaft, separate, small firing chamber, and a pair of opposed, spring biased abutments, in a rotary internal combustion engine.

FOREIGN PATENTS

France No. 757,595 (1933) shows a pair of diagonally opposed spring biased abutments;

Italy No. 374,201 (1939) evidently shows engine and compressor on the same shaft, with spring biased abutments and three runners;

France No. 1,318,018 (1963) shows spring biased abutments.

OBJECTS

In addition to providing an internal combustion rotary power plant as set forth above, further objects are to provide in it a combination of easy assembly and disassembly using primarily bolt-on subassemblies, which provides for extra torque on demand at any speed of operation.

BRIEF SUMMARY OF THE INVENTION

In brief summary given for cursory descriptive purposes only and not as limitation the invention provides in a rotary power plant system, three bolt-on, axially spaced-apart subsystems on a common shaft: rotary internal combustion engine, fuel/air compressor for the engine, and between these a supportive gearbox synchronizing ignition and valving; fuel-air from the compressor enters manifold mechanism on the rotary engine where it ignites in successive valve-isolated charges which are sequentially admitted after ignition to expansible chamber mechanism of the rotary engine in synchronism with the rotation, driving the rotary engine rotor; in an embodiment booster power is supplied using rotary engine exhaust pulses to reciprocate a fuel/air pump operating in parallel with the compressor subsystem.

The above and other objects and advantages of the invention will become more readily understood on examination of the following description, including the drawings in which like reference numerals refer to like parts:

Figure 5:
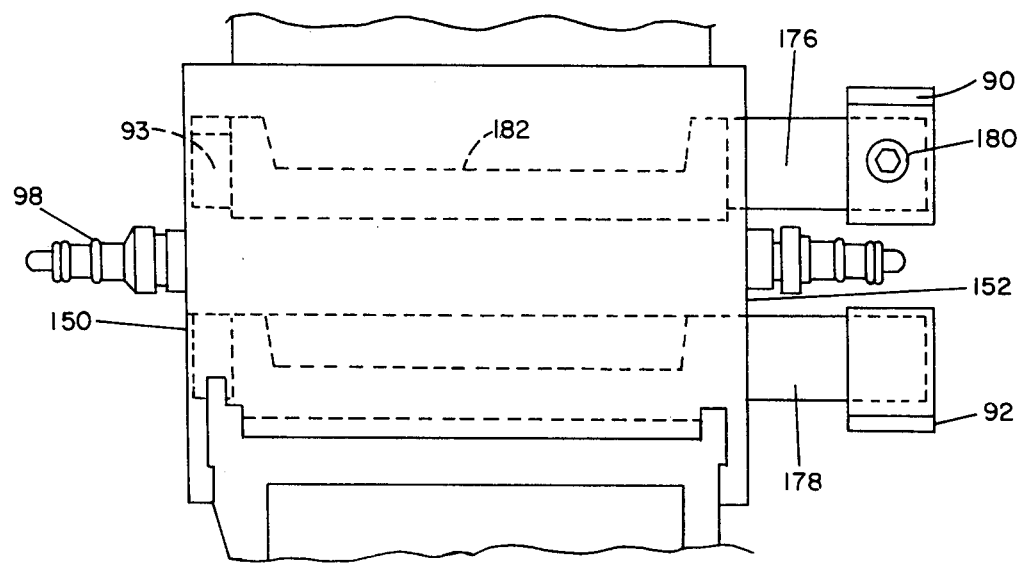
Figure 6:
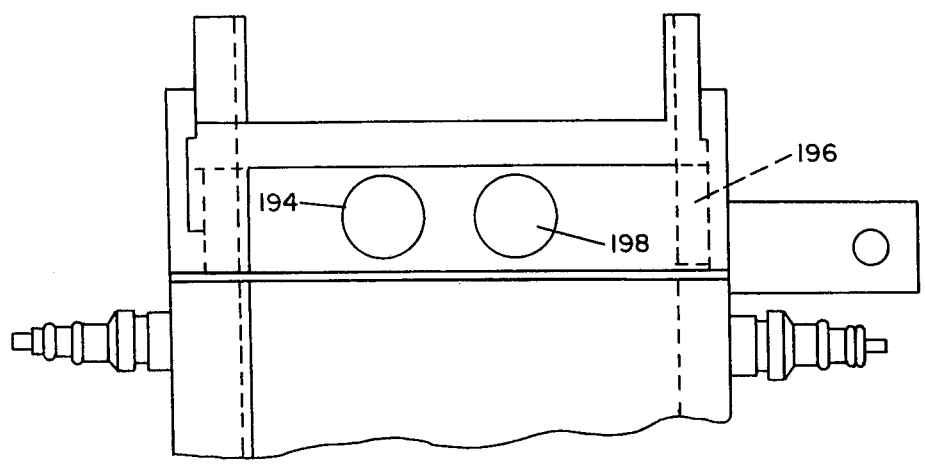
Figure 15A:
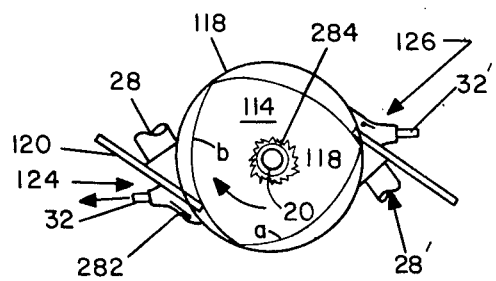
Figure 15B:
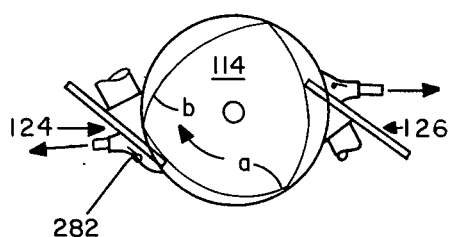
Figure 15C:
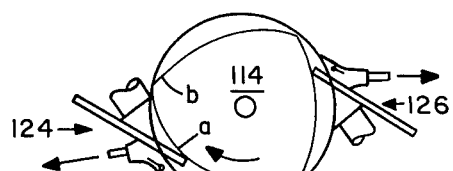
Figure 15D:
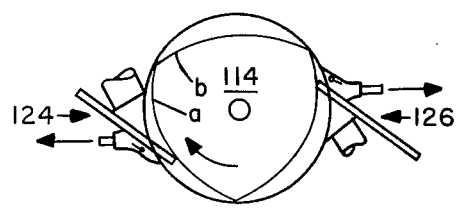
Figure 15E:
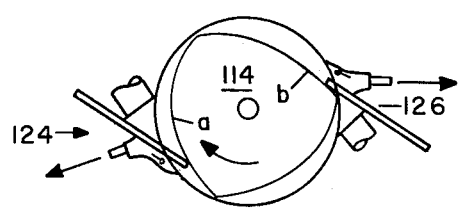
Figure 15F:
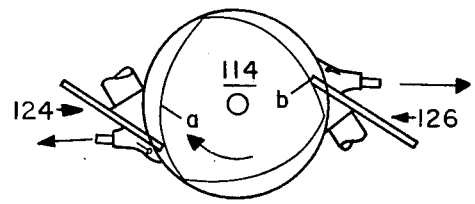
Figure 16:
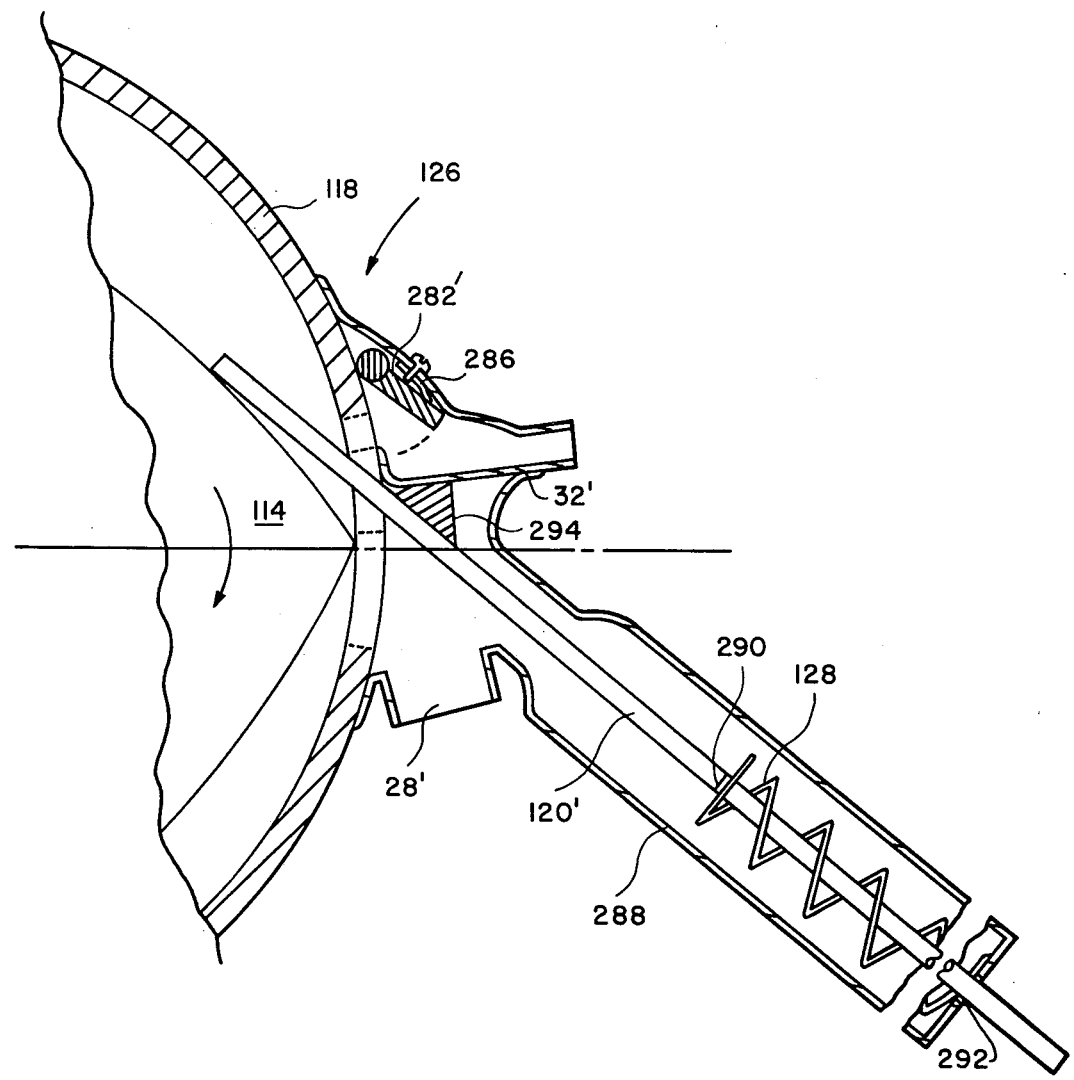
Figure 17:
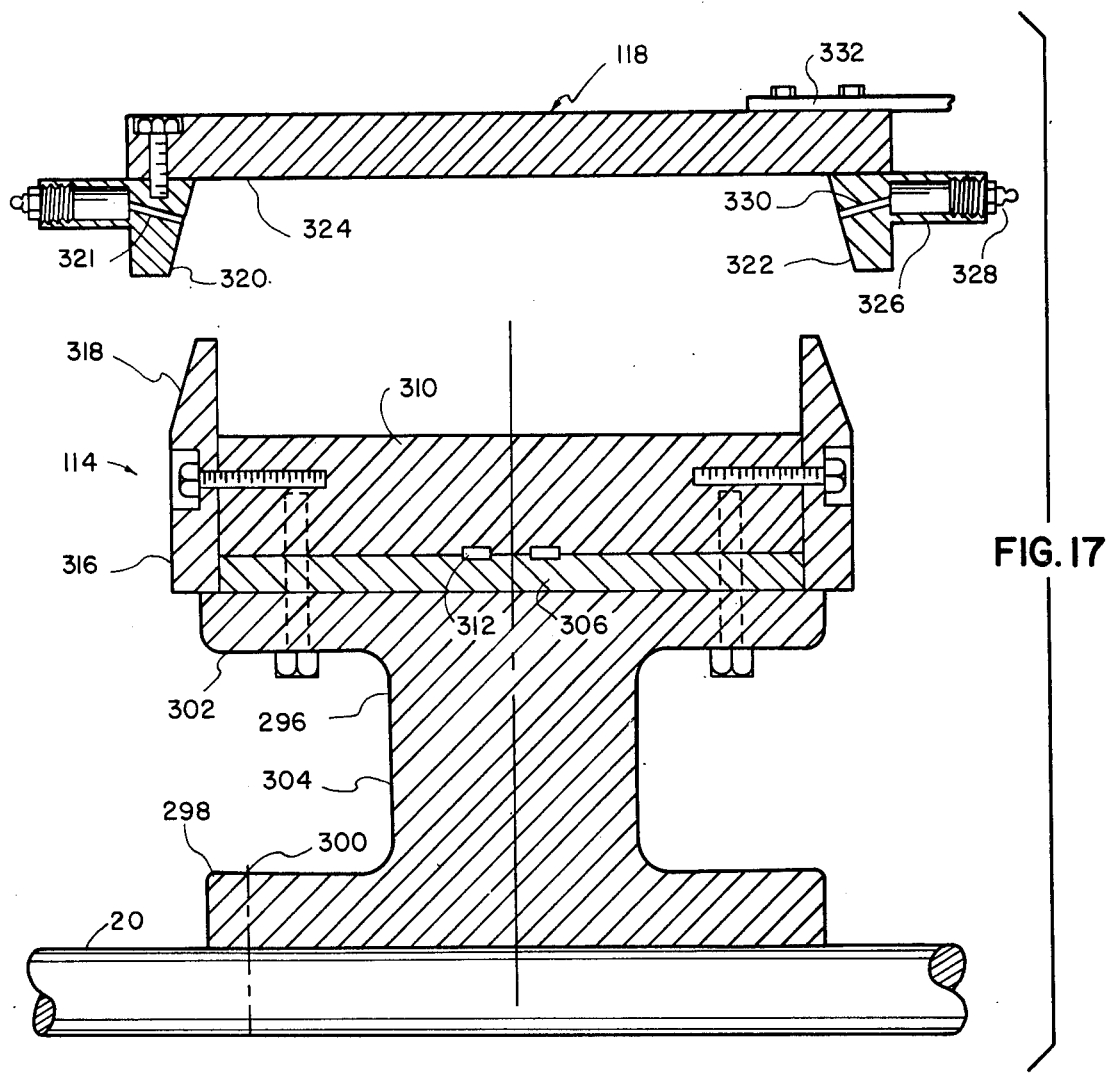
Figure 18:
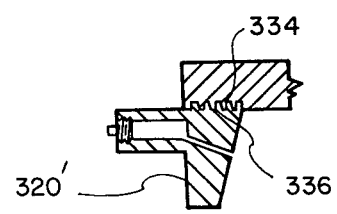
Figure 20:
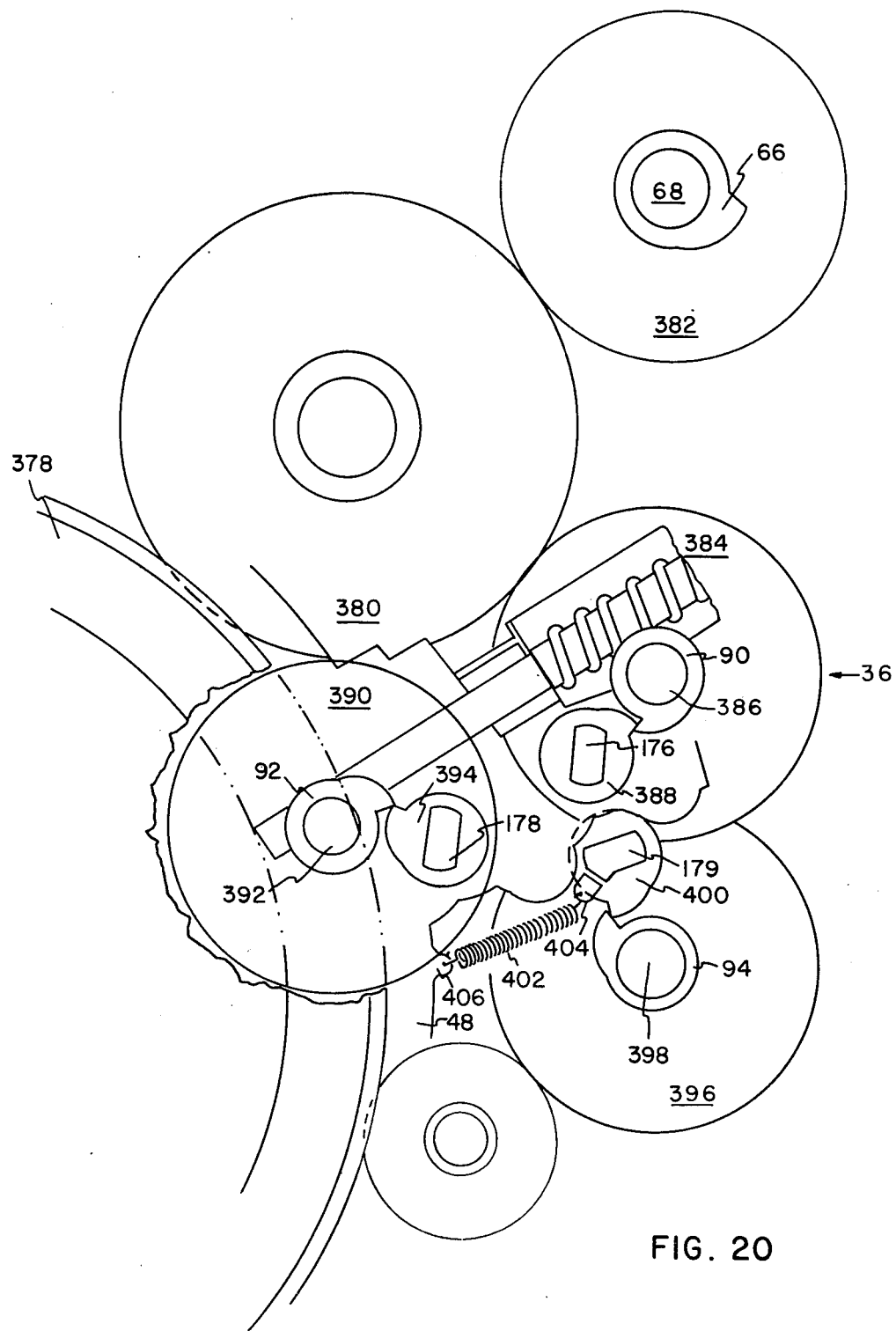

FIGS. 3a–3f diagram successive positions of operation within one rotation of the rotary internal combustion engine rotor, valving and abutments as viewed axially from the gearing subsystem;

FIG. 4 is a side elevational diagram of a station assembly viewed as in FIGS. 3a–3f;

FIG. 5 is a bottom plan diagrammatic detail adapted from 5—5, FIG. 4;

FIG. 6 is a top plan diagrammatic detail adapted from 6—6, FIG. 4;

FIG. 7 is an axial view detail of foot and engine-rotor part to which mounted;

FIG. 8 is adapted from 8—8, FIG. 7, and is drawn on a reduced scale;

FIG. 9 is an axial view detail of cooling provisions of a rotor;

FIG. 10 is an exploded-assembly cross-sectional view adding to the showing of 10—10, FIG. 9;

FIGS. 11 through 14 are cross-sectional details through respective rotors showing different embodiments;

FIGS. 15 through 15f are successive position diagrams of a compressor subsystem in operation as viewed axially from the gearing subsystem;

FIG. 16 is an axial-view diagrammatic detail of a compressor station partly in section;

FIG. 17 is a cross-sectional diagrammatic view of a compressor rotor assembly;

FIG. 18 is a sectional detail of an alternative rotor provision;

FIG. 19 is a diagrammatic sectional view of a booster pump arrangement;

FIG. 20 is a fragmentary gearing and drive diagrammatic detail with portions out of scale, showing parts of an engine station viewed axially looking towards the gearing subsection; and FIG. 21 is a schematic diagram of the ignition distributor system.

INDEX

The following outline gives the headings used in the specification from this point on:

BRIEF OVERVIEW AND ACCOUNT OF OPERATION
    Rotary internal combustion engine subsystem, brief description
    Rotary compressor subsystem, brief description
    Gearing subsystem, brief description
DETAILS ROTARY INTERNAL COMBUSTION ENGINE
    Operational sequence details, engine
    Manifold details, engine
    Abutment details, engine
    Cooling details, engine stations
    Runner and rotor details, engine
    Rotor chamber assembly details, engine
DETAILS ROTARY COMPRESSOR SUBSYSTEM
    Operational sequence details, compressor
    Construction details, compressor
    Preferred embodiment details, compressor
    Booster pump details
DETAILS GEARING SUBSYSTEM
    Ignition schematic

BRIEF OVERVIEW AND ACCOUNT OF OPERATION

The first two Figures will be used for overview of the invention and reference to subsequent Figures will give details.

Figure 1:
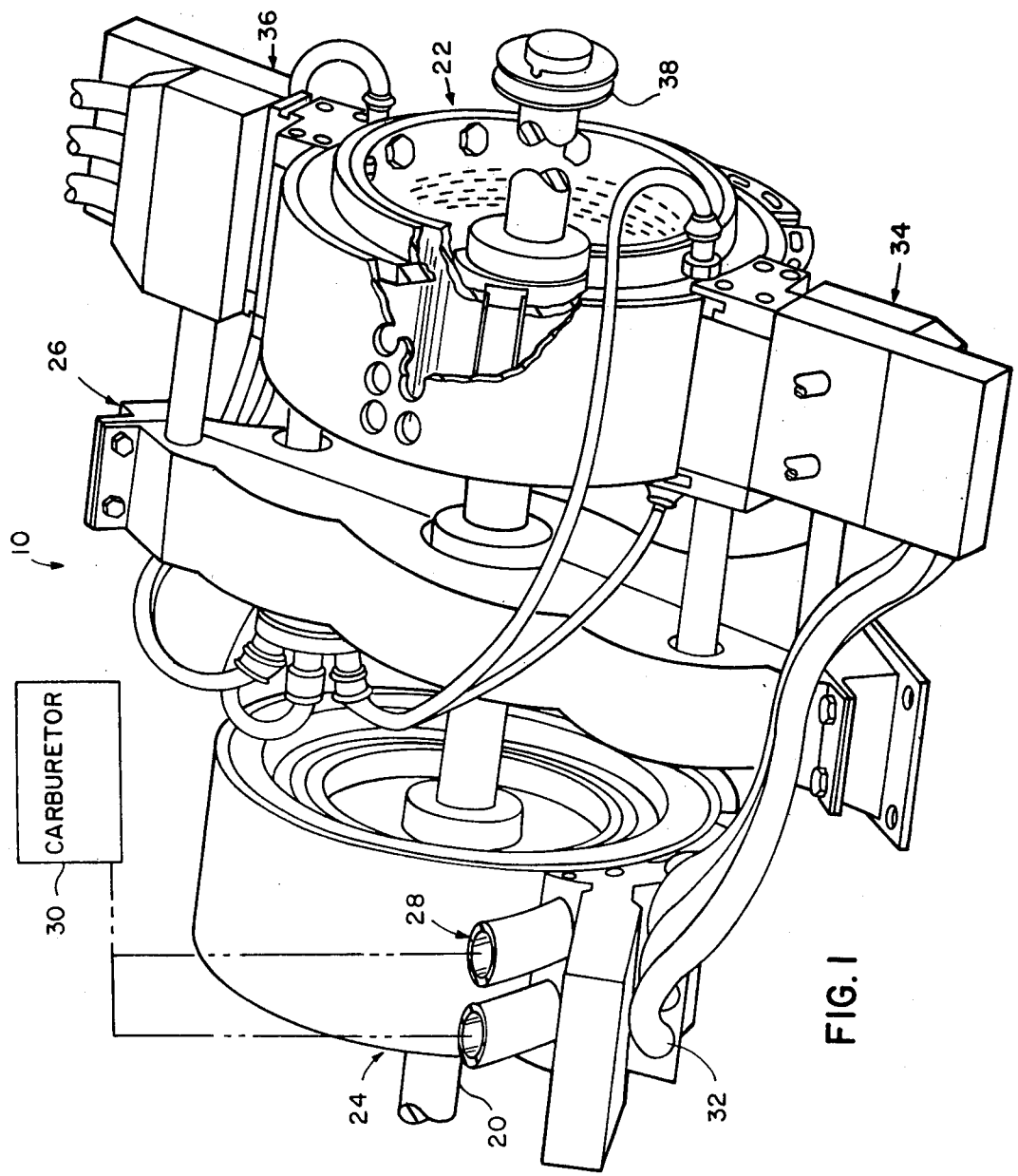
FIG. 1 is a generalized perspective drawing of the exterior of the invention.

FIG. 1 shows the invention 10 as comprising in coaxial relation affixed to a common straight driveshaft 20, three coacting subsystems: rotary internal combustion engine 22, gaseous fuel supply or compressor subsystem 24 and gearing subsystem 26.

In operation, fuel/air taken in at 28 from a conventional carburetor 30 is compressed and passed through conduits 32 into the rotary internal combustion engine subsystem 22 at two engine stations 34, 36 in alternation where it is ignited in discrete valve-isolated successive increments which pass into a rotor-expanded chamber in the engine and drive a rotor which in turn rotates driveshaft 20 which drives the compressor subsystem and external load to which connected in conventional manner, as by a pulley 38 on the driveshaft.

The gearing subsystem 26 drives and synchronizes ignition and valving provisions.

ROTARY INTERNAL COMBUSTION ENGINE, BRIEF DESCRIPTION

Figure 2:
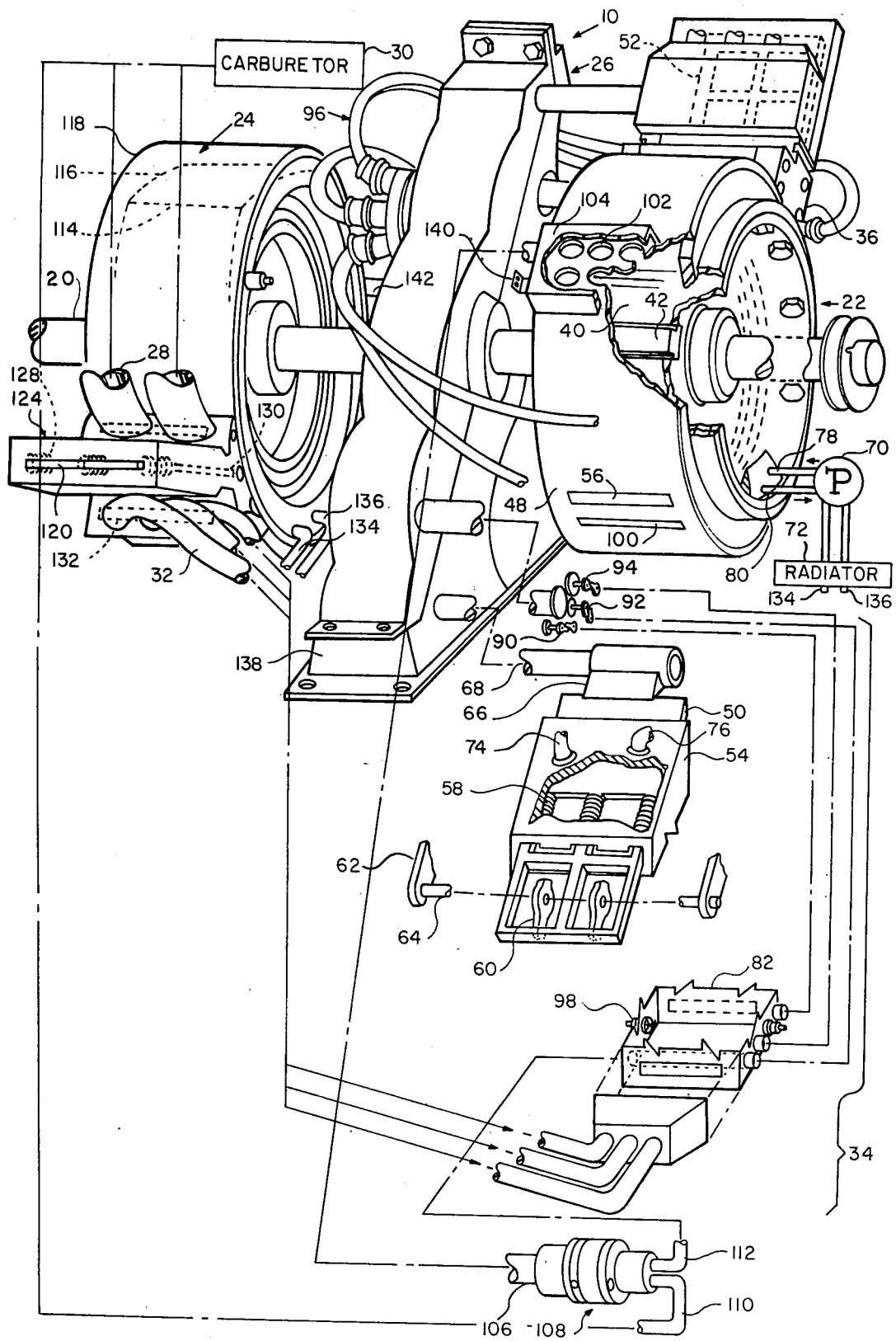
FIG. 2 is an exploded diagrammatical perspective showing of relations of subassemblies.

FIG. 2 diagrams major components and relations; those of the rotary internal combustion engine as follows.

Rotor 40 is mounted on drive shaft 20 and the generally circular periphery of the disc shaped rotor carries three runners 42 (shown) 44, 46 at equal spacings which form a close, running seal with the interior walls of a cylindrical-shaped annular chamber coaxial with the driveshaft and formed by a circular housing 48 enclosing the rotor and fixed relative to it.

The two engine stations 34, 36 are opposed 180° on the housing, are similarly supplied, and similarly provide several functions through co-acting mechanisms.

At each station, means for dividing the annular chamber into plural combustion chambers in coaction with the runners comprises an abutment 50 slidably mounted in a casing 54 to protrude through a close-fitting slot 56 in the housing 48. Springs 58 bias the abutment inward and pivotal arms 60, which may be conventionally supported on the casing on brackets and shaft 62, 64, are urged outward cyclically by a cam 66 extending from a shaft 68 supported in the gearing subsystem. Lubrication and coolant for the abutments flow from conventional pump 70 and radiator 72 through lines 74, 76 to the casing and through special cavities around the abutment and returns; as will be seen lines 78, 80 similarly serve the engine rotor. The pump may be driven by conventional connection with the driveshaft.

Compressed fuel/air mixture from the compressor section which travels through conduits 32, is received at each station by a respective manifold 82 which isolates it in successive charges by action of first, second and third valves (shown in the next Figure at 84, 86, 88) which are driven through cam connection 90, 92, 94 with the gear section, ignites each charge in turn by ignition system 96 and spark plugs 98, and then admits the ignited charge into an expansion chamber at housing intake port 100. Each manifold is preferably integral with an abutment housing and shares the same coolant system.

Exhaust ports 102 in the housing pass exhaust through exhaust manifold 104 from each combustion chamber through appropriate exhaust ducting 106 to actuate an optional feature, a respective station booster pump 108 to compress further fuel air mixture received from the compressor section through a conduit 110 and inject it through conduit 112 into the manifold 82 for ignition as part of each charge. The two exhaust locations are at 180° to each other and may advantageously be substantially at right angles to the engine stations.

ROTARY COMPRESSOR SUBSYSTEM, BRIEF DESCRIPTION

The compressor section includes a rotor 114 in modified equilateral triangular shape with the sides of the triangle convex, producing three arcuate-lobe configuration symmetrically mounted on the driveshaft and rotating in an annular chamber 116 of cylindrical form coaxial with the drive-shaft and formed by housing 118 which is fixed relative to the rotor as will be seen.

The rotor forms a close, running seal with the annular chamber at the sides and at the apexes of the triangular shape and divides the annular chamber into three chambers, two of which are at any given time serving as compression chambers by coaction with a pair of abutments 120, (122 not shown) disposed at similarly provided stations 124, (126 not shown) provided in 180° opposition about the axis. Springs 128 bias the abutments inwardly, and contact between each abutment inner end 130 and the periphery of the rotor cams the respective abutments out.

As indicated above, at each compressor station fuel-/air mixture from the conventional carburetor 30 is drawn into the compressor at intake openings 28, is compressed, and ejects through a spring-biased check valve 132 and the conduits 32 which carry it to the intake of the engine manifold 82, and of the booster pump 108, on the rotary internal combustion engine.

Coolant, if employed, which is optional, may be supplied from pump and radiator 70, 72 through appropriate lines 134, 136 to the compressor rotor and return. As will be seen, coolant arrangements generally are like those for the rotary internal combustion engine.

GEARING SUBSYSTEM, SUBSYSTEM BRIEF DESCRIPTION

Gearing subsystem 26 comprises a case 138 for attachment to a foundation or a vehicle frame or the like and preferably supports on respective sides of it by means of shafting and conventional housing-to-housing brackets 140, 142 the rotary internal combustion engine subsystem 22 and the compressor subsystem 24.

Short-coupling is provided by the central location, stub shafts extend to the rotary internal combustion engine for cam-operation of the abutments and the valves as mentioned above. In accordance with the invention all shafts rotate continuously during operation of the rotary power plant system.

DETAILS, ROTARY INTERNAL COMBUSTION ENGINE

As a further introduction, the operational sequence is described before details of other mechanism.

OPERATIONAL SEQUENCE DETAILS, ENGINE

FIGS. 3a-3f diagram operation of the rotary internal combustion engine in successive positions of rotation of the engine rotor 40 relative to the housing 48, and corresponding successive positions of the valving and abutments.

FIG. 3a

Station 34 venting: the manifold is venting to the rotor chamber, between runners 44 and 46, through second valve 86 and the rotor chamber is venting through exhaust port 102. The first valve 84 and the third valve 88 may operate simultaneously. Even if the booster is not in operation, a check-valve which will be described later prevents back-filling of the booster. Here the first and third valves are both closed. Abutment 50 is in the out position.

Station 36 igniting: a charge of compressed fuel/air confined in the manifold and isolated by closure of all three valves 84', 86', 88' is being ignited.

FIG. 3b

Station 34, receiving fuel/air: the first and third valves 84, 88 are open and the second valve 86 is closed; abutment 50 is "out".

Station 36, power stroke begins: valves 84' and 88' are closed and valve 86' is open, admitting ignited fuel/air into propulsion chamber 144 formed by runner 42 and closure of abutment 50' to "in" position against the cylindrical portion of the rotor.

FIG. 3c

Station 34, igniting: all three valves are closed and abutment 50 is "in", ready for the power stroke, which follows.

Station 36, venting: valve 86' is open and abutment 50' is "out".

FIG. 3d

Station 34, power stroke begins: valves 84 and 88 are closed and valve 86 is open.

Station 36, receiving fuel/air: valves 84' and 88' are open, valve 86' is closed and abutment 50' is "out".

FIG. 3e

Station 34, venting: valve 86 is open, valves 84 and 88 are closed and abutment 50 is "out".

Station 36, igniting: all three valves are closed and abutment 50' is "in", ready for the power stroke, which follows.

FIG. 3f

Station 34, receiving fuel/air: the first and third valves 84 and 88 are open and the second valve 86, is closed, abutment 50 is "out".

Station 36, power stroke begins: valves 84' and 88' are closed and valve 86' is open, admitting ignited fuel air into propulsion chamber 146 defined by runner 46 and abutment 50' in the "in" position.

Operation continues in this cyclical sequence.

MANIFOLD DETAILS, ENGINE

FIGS. 4 and 5 are respectively side elevational sectional diagram of a station assembly of manifold 82 and mechanism for abutment 50, and a bottom plan diagrammatical detail. This includes the generally sectionally-rectangular casing 54 having core 148, sides 150, 152 and top 154 and bottom 156. These form a slideway for the abutment above (in this station, both stations being in opposite rotational alignment) and a manifold below, and may be conventionally held together and affixed to the housing 48 of the rotary internal combustion engine by appropriate bolts 158. Intake connection may be by conventional header 160 soldered or bolted in place.

Straight-through manifold passage 162 extends from intake opening 164 for fuel/air from the rotary compressor to intake port 100 in the housing 48 and has a rectangular cross-section with conventional transverse-axis cylindrical valve seats 166, 168 spaced along it for the first valve 84 and the second valve 86 respectively.

At an angle to the straight through passage, booster pump supplied fuel/air enters at intake 170, another rectangular opening which may be connected through a conventional header 172. Third valve 88, similar to the first two, opens and shuts the booster passage 174 connecting with the straight through passage. The valves are alike and are actuated, as indicated earlier, by respective shaft extensions 176, 178 (shown in FIG. 5) which have respective cams, 90, 92 shown, mounted on them. The cams may have conventional adjustable mounting as by set screws 180 or adjustable eccentrics, to permit easy phasing of operation of the respective valves. Sealing of the valves is also conventional: the ends of the valve portions may have respective circular seats 93 at reduced portions. Each valve may advantageously comprise less than a hemi-cylinder of solid metal along the gate portion 182. (FIG. 5).

On each side of the manifold a respective spark plug 98 protrudes into the manifold portion isolatable by the three valves.

ABUTMENT DETAILS, ENGINE

FIG. 4 also shows abutment mounting details.

Abutment 50 is rectangular in cross-section generally and slides outward and inward in close fitting apertures 56 and 184 respectively in the housing 48 and casing 54 of the station assembly.

Width of the abutment forms a close fit with the sides of the housing and the abutment end 186 when in the inward position rubs on the circular portion of the rotor 40.

Plane of travel of the abutment makes an angle of 10° with the radius of the rotor passing centrally through the end of the abutment, which inclines in the direction of rotation of the rotor, and the end of the abutment is correspondingly bevelled to compensate for this. Result in that the load of expanding gas in the pressure stroke forces the abutment to seal more tightly against the rotor circular portion.

After the pressure stroke, the abutment retracts into the housing 48 to permit clear rotor runner passage, actuated by continuously rotating camshaft 68 driving cam 66 against link mechanism 60 which pivots on a fixed shaft 64 conventionally supported. The rounded end portion 188 of the link mechanism operates in clearance 190 in the unitary abutment to urge flange structure 192 framing the clearance and move it against the bias of spring 58, which presses against the abutment 50 at the inward end and against the casing at the outward end.

COOLING DETAILS, ENGINE STATIONS

FIGS. 4 and 5 also show station cooling details.
FIG. 6 is described here with FIGS. 4 and 5.

Coolant oil is conventionally supplied from a conventional pressure source 70 through hose 134 to casing intake 194, flows against the outer face of the abutment, around the sides and inwardly along the inner face of the abutment in cavity 196. This cavity is formed in part by the core 148 dividing the manifold from the abutment and so heat is taken from the manifold also as the coolant flows past, then around the edges of the abutment and returns to the source through exhaust 198 and line 136.

RUNNER AND ROTOR DETAILS, ENGINE

FIGS. 7 and 8 show how each of the three identical runners, 42 shown, anchors to the cylindrical surface or perimeter of rotor 40 in a respective recess 200 which fits an arcuate foot 202 along the bottom of the runner and extending fore-and-aft of it, flush with the rotor periphery. Machine screws 204 through the foot engage threaded holes 206 in the rotor and secure the runner.

The front or leading wall 208 of each runner sweeps back at an angle of 30° to the rotor radius intersecting the lower front corner and similarly the rear wall 210 sweeps back at an angle of 30° to the rotor radius intersecting the lower rear corner.

Each runner has an interior cavity 211 defined by the sides 212, front and rear walls and top 214 which may all be separate pieces, held together with machine screws 216; flush machine screws 218 hold the base to the other parts.

The top and sides arcuately wedge up and out in shape respectively, toward the rear, assuring that they will make a good seal by gathering lubricant in the front and forcing it into the narrowing clearance at the rear.

FIGS. 9 and 10 diagram runner and rotor cooling details.

Cooling for the rotor 40 and runners 42, 44, 46 preferably uses the same conventional source as that for the abutment and manifold.

The cavity 211 in each runner has two bore-connections 220, 222 internally through the rotor to two respective circular grooves 224, 226 in a rotor face 228 coaxial with the driveshaft. The smaller diameter groove 226 is called the inner groove and the larger diameter groove 224 is called the outer groove.

A hydraulic commutator ring 230 having first and second grooves 232, 234 dimensionally matching the rotor inner and outer groovers and complementary sealing flanges, 236 numbered, around them is fixed in axial confrontation with the grooves rotor face and coolant is fed through line 134, the inner commutator ring groove, the bore connection, the runner cavity, the second bore connection, the outer commutator ring groove, and back to the source through line 136.

ROTOR CHAMBER ASSEMBLY DETAILS, ENGINE

The rotor chamber or engine housing may be rotationally fixed relative to the rotor by any convenient means such as by brackets as noted above. Various mechanisms are provided in different embodiments according to this invention to assure sealed, low-friction running fits with the rotor and runners and easy assembly, dis-assembly and maintenance.

FIG. 11 diagrams a first embodiment in which the annular housing 48a is a straight-walled square "U" shape in cross section and fits on each side to respective axial circular faces 238 coaxially on the rotor 40a perimeter, radially inward of the area 240 swept by the rotor.

Sealing is by means of inner 244a and outer 242a coaxial gaskets fitted in axially matching circular grooves 246a, 248a respectively in the rotor and housing.

Conventional means such as cement may be used to secure the gaskets to one element of the relatively moving elements. The gaskets may be of any suitable high temperature low friction material of which many are available on the market, including many plastic compounds, "Teflon" being an example.

For easy assembly, inspection and maintenance, one ring-shaped side 250 or axial end of the housing, comprising in cross-section at least one entire leg of the squared "U" shape, is detachably mounted, as by machine screws 252 through the outer part into the side. Conventional gasketing may be employed for sealing here as well as elsewhere not specifically set out in this disclosure.

Radially extending flanges 254, 256 are a feature of all embodiments of the housing, and stiffen it as well as providing for ready attachment of the stations and other components.

FIG. 12 diagrams the second embodiment of rotor 40b and housing 48b which is similar to the first embodiment except that the sides of the rotor have in cross-section downwardly stepped axial recesses 258, 260 forming axially extending circular flanges receiving the inner circular portions of 250b, 251b axially outboard of the rotor portion holding the gaskets, and retaining rings 262b, 264b which also may seal, fit around the stepped down axial portions of the rotor and are held against the housing, by machine screws 266 passing through the stepped down portions of the rotor.

FIG. 13 diagrams a further rotor/housing embodiment, 40c, 48c in which the periphery of the rotor 40c is a simple cylinder in shape but sufficiently wider than the housing to permit a ring 264c held around the periphery by bolts 268 to secure the gaskets 242c, 244c, using a similar arrangement of grooves facing grooves 246c, 248c, in the housing axial faces. The lower groove in the housing may have only outer and axial faces with the rotor periphery bearing on the inner face, and the grooves may be axially staggered, as shown. Pressure flexure tightens the seal.

Figure 14:
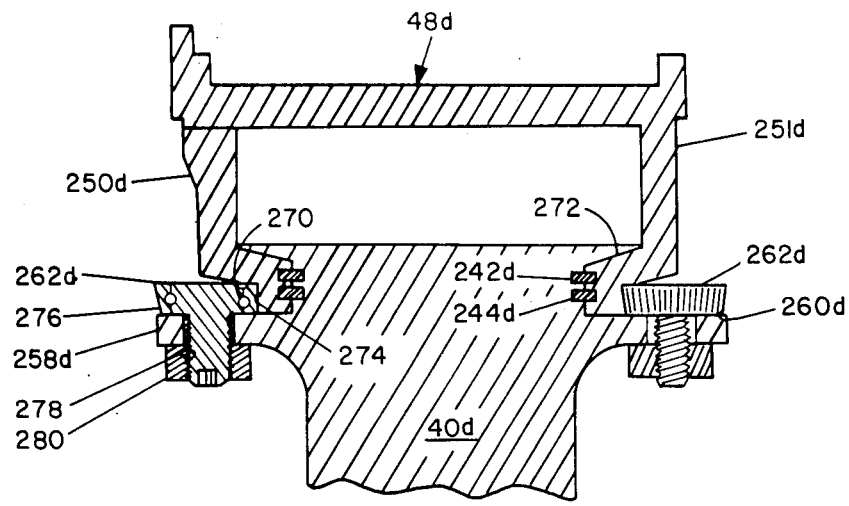

FIG. 14 diagrams still a further embodiment of rotor 40d and housing 48d which is generally similar to the others but has the differences set out here. In cross-section the legs of the "U", 250d, 251d, first turn inward towards each other at an open angle of perhaps 100° and then return to the straight radial direction parallel with the original direction. In section this forms an offset axially inward recess 270 with a slanting transition 272 on each axial outer face, and similarly an inward axial protrusion with a slanting transition on the axially inward faces. In addition, the return portion increasingly thickens toward the end of each leg forming a retaining slope 274.

The cylindrical periphery of the rotor 40d extends on each side in section, to fit the inner transition on each side, producing nearly a feather edge overhanging the straight terminal portions of the legs, which carry the gaskets 242d, 244d in similar manner to the first embodiment. Cylindrical rotor flanges 258d, 260d extend axially outward across the ends of the housing legs, in section, with slight clearance, and carry a plurality of anti-friction bearings 262d which have respective tapered outer races 276 drawn into snug running fit with the housing retaining slopes 274 by screw-threaded axial protrusions 278 of the inner races. Any conventional means may be used for tightening the nuts 280 on the threaded portions, such as hexagonal broached recesses in the free ends of the threaded portions.

DETAILS, ROTARY COMPRESSOR SUBSYSTEM

As a further introduction, operational sequence of the compressor is set out before going into further provisions.

OPERATIONAL SEQUENCE DETAILS, COMPRESSOR

FIGS. 15a through 15f diagram successive positions in the operating cycle of compressor subsystem components. As noted above, the compressor rotor 114 comprises in axial view generally an equilateral triangle with convex faces symmetrically mounted on the driveshaft 20 and driven by the rotary internal combustion engine, to which it supplies compressed fuel/air mixture. The compressor housing 118 forms a cylindrical chamber coaxial with the rotor.

The two compressor stations 124, 126 are disposed in 180° radial opposition in the housing relative to the drive axis.

Each compressor station includes four components: fuel/air inlet 28 and compressed fuel/air exhaust 32 separated by sliding abutment member 120, and a check valve 282 in the fuel/air exhaust prevents back flow.

Each of the abutments is inclined in the direction of rotor rotation at an angle of 30° to a diameter passing through the two compressor stations, and each is biased inwardly, forming a running seal with the end against the compressor rotor and at the sides and around the reciprocating sliding engagement of the abutment with the housing.

In the Figures rotation is indicated by the arrows.

FIG. 15a shows at station 124 the end of the compression stroke formed by decreasing volume in the space which is defined by the oncoming lobe a of the rotor and the abutment 120; compressed gas is exiting through 32 which leads to the rotary internal combustion engine intake.

Uncompressed fuel/air mixture is being drawn in from the carburetor through 28 into the expanding space formed by the departing lobe b and the abutment 120.

Station 126 operates similarly and is at midstroke of the compression side and the intake side, expelling compressed fuel/air at 32' and drawing in uncompressed fuel/air at 28'.

FIG. 15b shows station 124 beginning a compression stroke and almost beginning intake. Valve 282 checks backflowloss of pressure at this point, as well as when the system is at rest momentarily.

Station 126 is continuing as before.

FIG. 15c shows both stations continuing in the portion of the cycle described, station 124 is now intaking.

FIG. 15d shows station 124 midway through compression/intake at lobe a, and station 126 is nearing the end of the particular compression stroke although still intaking.

FIG. 15e shows station 124 continuing and station 126 just beginning a new compression and intake regime.

FIG. 15f indicates further continuation positions as described.

It will be noted that one station is at full midpoint of operation as the other goes through transition between lobes, tending to even-out surges in power demand and in fuel/air supply requirements and, importantly, in the compressed fuel flow to the rotary internal combustion engine.

CONSTRUCTION DETAILS, COMPRESSOR

The compressor may be as simple as the diagrams above indicate, a unitary rotor forming a close-running fit in a simple housing closed except for the shaft connection which may be sealed-around as 284, FIG. 15a, construction details being conventional throughout; 118 is a housing fragment.

FIG. 16 is an enlarged detail of a compressor station 126 indicating the intake passage 28', exhaust passage 32' with check valve 282' which may be conventionally biased closed by a spring 286; wall of housing 118, rotor 114, abutment 120' with casing 288 compressing inward-biasing compression spring 128 between the outer end of the housing and the stop 290 on the abutment. The abutment in plan is generally like a paddle with three parallel handles, each having a spring on it and the handle ends projecting through guide holes 292 in the outer end of the housing. The stop may be the inboard end of a handle.

Conventional sealing gaskets as at 294 may be cemented to the housing; these may be of any resilient, anti-friction material used for such purposes such as graphite-impregnated rubber.

The station assemblies may be conventionally welded or bolted in place.

PREFERRED EMBODIMENT DETAILS, COMPRESSOR

FIG. 17 shows a preferred embodiment compressor rotor/housing sub-assembly details in exploded sectional diagram.

The core 296 of rotor 114 has integral inner cylindrical flange 298, coaxially mounting to the driveshaft 20 and secured by any conventional means such as a pin at 300, and outer cylindrical flange 302 coaxially joined by a central radial web 304 to the inner flange.

Coaxially fitted around the outer ring as two circumferential layers are inner or first sleeve 306, and outer or second sleeve 310.

The first sleeve is cylindrical and the second has a cylindrical bore but has exterior periphery in the convexface triangular shape forming the rotor lobes. Appropriate matching grooves in the sleeves form lubricant channels 312, having similar connection for coolant circulation to the rotary internal combustion engine coolant provisions.

Each end of this assembly of sleeves is tightly capped-off by a radial circular flange 316 which extends outward from the core and has outer circumference tangent to the greatest outward protrusion of the rotor lobes formed by the second sleeve. The inner faces of the radial circular flanges are flat and square but the outer portions of the outer faces form an axial frustroconical surface 318, which outwardly diminishes the thickness. This gives each in section the appearance of a flat 20° bevel of each upper outer corner coextensive with the difference between the least and greatest radial protrusions of the working surface of the third sleeve or rotor lobe sleeve 310.

The housing 118 has a cylindrical shape with an inwardly extending flange 320, 322 at each end having an interior conical shape, angle and dimension complementary to the respective flanges 318 of the rotor assembly.

For adjustment of the interfit of the conical portions of the housing and the rotor, which have relative rotation on operation, and for ease in assembly, the housing inwardly extending flange 320 is provided as a separate ring with circumference fitting the cylindrical inner surface 324 of the housing. Bolt 321 attachment may provide for sliding and clamping these two components in selected axial relation. Similarly the rotor conical flanges can be shimmed to adjust this fit.

At intervals on the axial faces of the housing flanges 320 and 322 a lubrication chamber 326 is provided, with a screw plunger 328 to force grease through an aperture 330 into the space between the conical faces of the housing and rotor flanges. This lubricates and helps seal.

The housing may be attached to the gear casing by any convenient means such as brackets represented by 332.

FIG. 18 indicates how in a preferred embodiment the housing flange 320' can be screwed into the housing using circumferential threads 334, 336 in each. This obviously facilitates fine adjustment of the fit of the interior and exterior conical shapes.

BOOSTER PUMP DETAILS

FIG. 19 details the booster pump arrangement.

As noted above, exhaust gas from rotary internal combustion engine exhaust ports 102 at both stations (one shown in FIG. 2) drives respective booster pumps, 108 indicated, when extra power is required.

A conventional valve, bypass valve 338, may be used to divert exhaust gas to and from the booster pumps to control them.

Each booster pump comprises a housing 340 having coaxial cylindrical first and second portions 342, 344. The first portion is larger in diameter and joins the second portions at an integral annular cylinder-wall 346. Within the housing is a piston 348 having a larger diameter portion 350 in the first portion and a smaller diameter portion 352, joined to it at an annular piston-wall 354.

A sleeve-valve arrangement within the first chamber comprises a sleeve 356 with an outer diameter forming a close running fit within the housing first portion and an inner diameter forming a close running fit with the piston larger diameter portion, which is approximately one fourth, in length, the distance between respective first and second inwardly protrusive rings 358, 360 on the sleeve.

As exhaust gas passes through conduit 106 into the housing through intake holes 362 it forces the piston forward against the bias of compression-spring 364 which is wound around the smaller diameter portion of the piston and bears against the housing annular wall at one end and against the piston annular wall at the other. Vent holes 366 prevent pressure changes forward of the piston in the housing larger diameter portion.

At the extreme forward position the piston strikes ring 360 and moves the sleeve forward, opening exhaust gas exit holes 368.

Gas continues to exhaust until the piston returns under spring bias and closes the exhaust gas exit holes by striking ring 358 and moving the sleeve rearwardly, beginning another cycle of pumping.

Pumping takes place on the forward stroke of the piston, and fuel/air mixture is taken in for compression on the reverse stroke, as follows.

The forward piston-stroke compresses gas in the housing smaller diameter portion 344 forcing open a conventional check valve 370, biased toward the closed position by a spring 374, and located at fuel/air exit port 372 which passes compressed fuel/air through conduit 112 to a manifold of the rotary internal combustion engine as indicated above.

The reverse piston-stroke starts with nearly all compressed gas expelled and, as the first check valve 370 is closed by the spring, creates a partial vacuum which opens second or reverse check valve 376, which is also conventional, is located in the end of the housing, and draws in fuel/air mixture from the carburetor through conduit 110 against the bias of spring 377.

It can be seen that there is no particular limit to the compression ratio or ratio of piston areas, within the bounds of available exhaust gas volume and pressure.

DETAILS: GEARING SUBSYSTEM

The gearing subsystem is simple: all gearing is spur-gearing which intermeshes at all times and rotates the shafting and accessories at all times of system operation. The drive gear or main gear is fixed on the driveshaft. Respective to the driveshaft the rotary internal combustion engine rotor and the compressor rotor are fixed as noted and so rotate one-to-one with it. The distributor conventionally may have two stations at 180° conventionally corresponding to the two engine stations and may rotate at three-to-one ratio with the driveshaft because each engine station operates three times per shaft revolution. The respective valves open and shut three times each per driveshaft revolution, setting that gear ratio for each valve, and similarly for the abutments which retract three times each per revolution, requiring these gears to be one-third the diameter of the main gear.

FIG. 20 diagrams the relation of the gearing elements and cam drives at engine station 36 of FIG. 3; a symmetrical arrangement serves the other engine station, 34 of FIG. 3 which is diametrically opposed to this one.

The engine housing is 48. Main gear 378 is fixed on driveshaft 20 (shown in other Figures) and through idler gear 380 of any convenient size to produce the spacing desired between the driveshaft and the output shaft, drives output gear 382 for shaft 68 which carries the abutment-drive cam 66. As an alternative, depending on distances between shafts, any conventional series of idlers or even chains may be used in any convenient combination. The arrangement here may be somewhat different from that of FIG. 2. Phasing of the cam may be made easy by clamping it or set-screwing it adjustably in rotation for preliminary setting and then pinning or welding it to the shaft, or the same may be done at the gear 380.

Similarly gear 384 drives shaft 386 and cam 90 for the first valve cam follower 388, 390 drives shaft 392 and cam 92 for the second valve cam follower 394, and gear 396 drives shaft 398 and cam 94 for the third valve cam follower 400. All cam followers may be broached and fitted over flats of complementary-shape extensions 176, 178, 179 of the respective valves. Direction of rotation may be the same for all output shafts at the station as indicated.

Conventional spring-return against valve cam action may be employed; as a typical example a tension spring 402 may be hooked over a lateral extension 404 of the valve extension and secured to a convenient part 406 of the housing of the system.

IGNITION SCHEMATIC

FIG. 21 shows the simple and conventional ignition subsystem.

Battery 408 has connection 410 to high voltage coil 412 through conventional spring-return breaker assembly 414 driven by cam 416 on rotor shaft 418. The rotor shaft in turn is driven by gear 420 from main gear 378. High voltage lead 426 from the coil connects through wiper contact 428 with the distributor arm 430 which in turn makes distribution contact at 432 and 434 three times each revolution of the main gear, so that the two spark plugs 436 connected in parallel by circuit 438 at each station fire three times per revolution of the rotary internal combustion engine. Suitable ground connections complete the circuit. Any equivalent circuit will serve as well.

From the above the synchronous smooth and powerful drive advantages of the common driveshaft in coaction with: (1.) the number of runners being in the ratio of three to two to the number of engine stations and engine exhaust, and (2.) the number of compressor lobes being in the ratio of three to two to the number of compressor stations, and (3.) the number of runners being equal to the number of lobes.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by United States Letters Patent is:

1. In an integrally supported system of an internal combustion rotary engine with means for engine valving, a first rotor and a first housing; a rotary compressor with a second rotor and a second housing for supplying gaseous fuel to the rotary engine, a gearbox with gearing therein for synchronizing said valving means, and a driveshaft connecting all of said rotary engine, rotary compressor and gearbox, the improvement comprising: the first and second rotors being fixed on respective end portions of the driveshaft in axially spaced relation with the gearbox, the driveshaft having a central portion located for attachment to a foundation and the gearbox centrally supporting the driveshaft thereby and through the driveshaft being the support for the first and second rotors; means spacedly connecting the gearbox with the first housing and with the second housing, and said gearbox through said spaced connection being the support for the first housing and the second housing.

* * * * *